(12) United States Patent
Hylands et al.

(10) Patent No.: US 8,938,945 B2
(45) Date of Patent: Jan. 27, 2015

(54) EXHAUST SYSTEM

(75) Inventors: Darryl William Hylands, Gotham (GB); Trevor Lee Fletcher, Nr Loughborough (GB)

(73) Assignee: T. Baden Hardstaff Ltd, Nottingham (GB)

( * ) Notice: Subject to any disclaimer, the term of this patent is extended or adjusted under 35 U.S.C. 154(b) by 635 days.

(21) Appl. No.: 12/740,779

(22) PCT Filed: Nov. 3, 2008

(86) PCT No.: PCT/GB2008/003709
§ 371 (c)(1),
(2), (4) Date: Jul. 2, 2010

(87) PCT Pub. No.: WO2009/056860
PCT Pub. Date: May 7, 2009

(65) Prior Publication Data
US 2010/0263352 A1 Oct. 21, 2010

(30) Foreign Application Priority Data

Nov. 2, 2007 (GB) .................................. 0721528.8
Apr. 10, 2008 (GB) .................................. 0806497.4

(51) Int. Cl.
*F02B 27/04* (2006.01)
*F01N 3/20* (2006.01)
(Continued)

(52) U.S. Cl.
CPC .............. *F01N 3/2066* (2013.01); *B01D 53/90* (2013.01); *B01D 53/9431* (2013.01); *F02D 19/105* (2013.01); *F02M 21/0227* (2013.01);
(Continued)

(58) Field of Classification Search
CPC .............. B01D 53/90; B01D 53/9431; B01D 2251/2067; B01D 2258/012; B01D 2258/018; F01N 13/009; F01N 3/2066; F01N 2570/14; F01N 2610/02; F02D 19/105; F02M 21/0227; F02B 3/06; Y02T 10/36; Y02T 10/32; Y02T 10/24
USPC ................................................... 60/274–301
See application file for complete search history.

(56) References Cited

U.S. PATENT DOCUMENTS 3,719,457 A * 3/1973 Nagamatsu .................. 422/176
5,065,576 A * 11/1991 Kanazawa et al. ............ 60/295
(Continued)

FOREIGN PATENT DOCUMENTS

DE 102 43 270 A1 3/2004
DE 10 2005 039630 B4 3/2007
(Continued)

OTHER PUBLICATIONS

Office Action from European Patent Application No. 08 843 417.0 dated May 17, 2011.
(Continued)

*Primary Examiner* — Jesse Bogue
(74) *Attorney, Agent, or Firm* — Wolf, Greenfield & Sacks, P.C.

(57) ABSTRACT

An exhaust system (10) for a dual fuel engine comprising a catalyst assembly comprising a first catalyst (4) comprising a methane oxidizing catalyst and a second catalyst (6) comprising a selective catalytic reduction catalyst, the first catalyst (4) being positioned upstream of the second catalyst (6).

11 Claims, 8 Drawing Sheets

(51) Int. Cl.
  *B01D 53/90* (2006.01)
  *B01D 53/94* (2006.01)
  *F02D 19/10* (2006.01)
  *F02M 21/02* (2006.01)
  *F01N 13/00* (2010.01)
  *F02B 3/06* (2006.01)

(52) U.S. Cl.
  CPC ...... *F01N13/009* (2013.01); *B01D 2251/2067* (2013.01); *B01D 2258/012* (2013.01); *B01D 2258/018* (2013.01); *F01N 2570/14* (2013.01); *F01N 2610/02* (2013.01); *F02B 3/06* (2013.01); *Y02T 10/36* (2013.01); *Y02T 10/32* (2013.01); *Y02T 10/24* (2013.01)
  USPC .............................................. 60/273; 60/301

(56) References Cited

U.S. PATENT DOCUMENTS

| | | | |
|---|---|---|---|
| 5,367,875 A * | 11/1994 | Aboujaoude et al. | 60/303 |
| 6,023,930 A * | 2/2000 | Abe et al. | 60/311 |
| 6,165,935 A | 12/2000 | Williamson et al. | |
| 6,312,650 B1 * | 11/2001 | Frederiksen et al. | 422/180 |
| 6,444,177 B1 * | 9/2002 | Muller et al. | 422/177 |
| 6,620,391 B2 | 9/2003 | Muller et al. | 423/210 |
| 6,680,037 B1 * | 1/2004 | Allansson et al. | 423/215.5 |
| 6,837,336 B2 * | 1/2005 | Gault et al. | 181/258 |
| 7,351,381 B2 * | 4/2008 | Ball et al. | 422/170 |
| 7,451,594 B2 * | 11/2008 | Blaisdell | 60/324 |
| 7,533,521 B2 * | 5/2009 | Dalla Betta et al. | 60/286 |
| 7,997,071 B2 * | 8/2011 | Blaisdell | 60/324 |
| 8,015,802 B2 * | 9/2011 | Nishiyama et al. | 60/286 |
| 2004/0098971 A1 | 5/2004 | Upadhyay et al. | |
| 2005/0138916 A1 | 6/2005 | Bonadies et al. | |
| 2005/0274331 A1 | 12/2005 | Eberspach | |
| 2006/0196169 A1 | 9/2006 | Ripper et al. | |
| 2006/0216215 A1 * | 9/2006 | Johnson et al. | 422/173 |
| 2007/0178025 A1 * | 8/2007 | Opris | 422/177 |

FOREIGN PATENT DOCUMENTS

| | | |
|---|---|---|
| EP | 0707883 A2 | 4/1996 |
| EP | 1 356 863 A1 | 10/2003 |
| GB | 2 381 218 A | 4/2003 |
| GB | 2381218 * | 4/2003 |
| GB | 2 434 557 A | 8/2007 |
| GB | 2454276 A | 5/2009 |
| JP | 07108136 A | 4/1995 |
| JP | 2000279766 A | 10/2000 |
| JP | 2004204700 A | 7/2004 |
| WO | WO 99/39809 A1 | 8/1999 |

OTHER PUBLICATIONS

Search Report; GB App. No. GB0806497.4, Filing Date Apr. 10, 2008 (Pub. No. GB 2454276, Pub. Date May 6, 2009); UK Intellectual Property Office; Feb. 23, 2009.

* cited by examiner

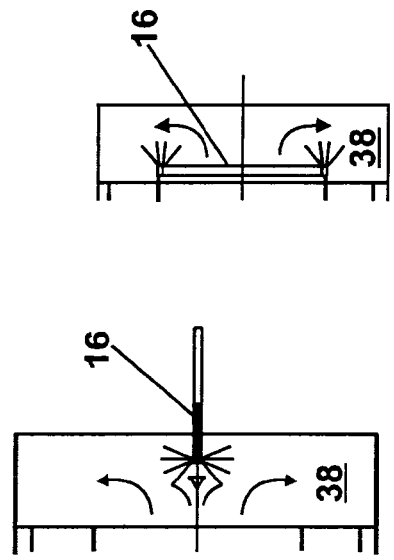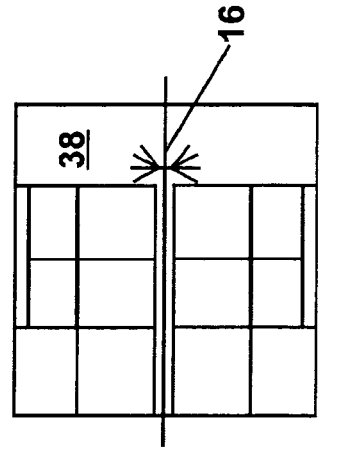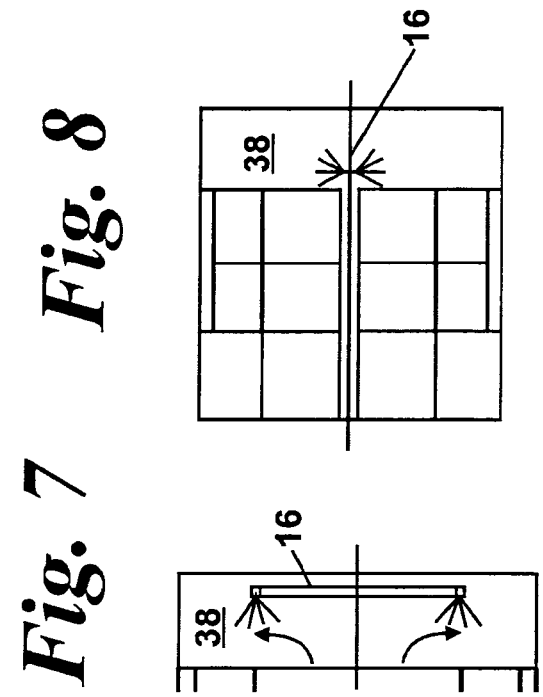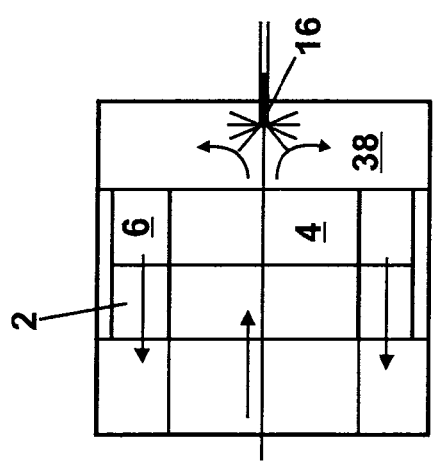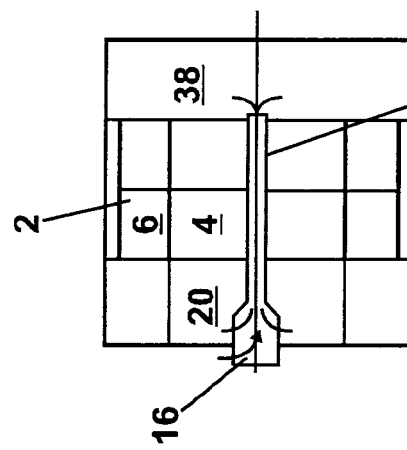

EXHAUST SYSTEM

CROSS-REFERENCE TO RELATED APPLICATIONS

This application is a national stage filing under 35 U.S.C. §371 of International Application No. PCT/GB2008/003709, filed Nov. 3, 2008, entitled EXHAUST SYSTEM. International Application No. PCT/GB2008/003709 claims priority to United Kingdom Application No. GB 0721528.8, filed Nov. 2, 2007, and United Kingdom Application No. GB 0806497.4, filed Apr. 10, 2008.

This invention relates to an exhaust system for use with an engine system, and in particular, relates to an exhaust system for a multi-mode engine system such as a dual fuel engine system.

A dual fuel engine is adapted to operate in two modes. Typically a first mode is a diesel mode in which the engine is fuelled entirely by diesel fuel, and a second mode is a gaseous fuel mode in which the engine is fuelled predominately by a gaseous fuel such as natural gas (methane) or propane which is ignited by a relatively small quantity of diesel.

This invention relates particularly, but not exclusively, to an exhaust system for a dual fuel engine system comprising an engine that runs on diesel and another fuel such as natural gas. It is to be understood, however, that the invention relates to an exhaust system for any multi-mode engine system running on any combination of fuels.

The operation of an engine such as an internal combustion engine on a mixture of a liquid fuel such as diesel, and a gaseous fuel such as methane maintains the fuel economy and engine efficiency of the engine, whilst at the same time reducing levels of undesirable exhaust emissions. As people generally become more aware of the disastrous effect on the environment and weather of the consumption of hydrocarbon fuels, there is a greater need to reduce carbon emissions from vehicles such as heavy goods vehicles. One way in which these emissions can be reduced is by powering such vehicles with dual fuel engines which, for at least some of the time, are fuelled predominately by methane, for example.

In most countries of the world, regulations exist to limit the level of exhaust emissions produced by, for example, road vehicles. These regulations are becoming ever more demanding in order to prevent the environment becoming more polluted.

One of the main pollutants contained within exhaust gases of an engine fuelled by diesel is nitrogen oxide ($NO_x$). As it is known in the art, $NO_x$ is the generic term for mono-nitrogen ($NO$ and $NO_2$).

In order to meet such emission regulations it is known to use a catalyst known as a selective catalytic reduction (SCR) catalyst in the exhaust system of a diesel engine in order to enable the levels of $NO_x$ in exhaust gases to be reduced. Such a catalyst forms part of a selective catalytic reduction (SCR) system. Known SCR systems comprise an SCR catalyst used in combination with urea.

A selective catalytic reduction (SCR) system is a means of removing nitrogen oxides from exhaust gases through a chemical reaction between the exhaust gases, a reductant, and a catalyst.

A gaseous or liquid reductant, most commonly ammonia or urea, is added to a stream of exhaust gas. The mixture is then absorbed onto a catalyst. The reductant reacts with $NO_x$ in the exhaust gases to form harmless water vapour ($H_2O$) and nitrogen gas ($N_2$).

It is known to use a vandium based catalyst, or a catalyst with zeolites as an SCR catalyst in an SCR system.

Vandium catalysts tend to be deactivated at temperatures above 600° C., whereas catalysts incorporating zeolites are more durable at higher temperatures and are therefore usually able to withstand extended operation at temperatures above 650° C., in addition to brief exposure to temperatures between 750 to 800° C.

It is additionally known to use iron and copper exchange zeolite catalysts together with urea as a reductant to form an efficient SCR system.

The SCR catalyst could of course be formed from any suitable material.

When $NO_x$ reacts with the reactant (urea or ammonia) the following chemical reactions occur:

$$6NO + 4NH_3 \rightarrow 5N_2 + 6H_2O$$

$$4NO + 4NH_3 + O_2 \rightarrow 4N_2 + 6H_2O$$

$$6NO_2 + 8NH_3 \rightarrow 7N_2 + 12H_2O$$

$$2NO_2 + 4NH_3 + O_2 \rightarrow 3N_2 + 6H_2O$$

$$NO + NO_2 + 2NH_3 \rightarrow 2N_2 + 3H_2O$$

When urea is used as the reactant, water solutions of urea are injected into an exhaust gas stream and evaporated. This is then followed by decomposition of urea to produce ammonia and carbon dioxide. It is preferable to use urea rather than ammonia due to the toxicity and resultant handling problems associated with using ammonia.

When an internal combustion engine runs in the second mode and is fuelled predominately by methane, a main pollutant contained in the exhaust gases is uncombusted methane. It is known to use a methane oxidising catalyst to facilitate a reduction of methane in such exhaust gases. A methane oxidising catalyst enables uncombusted methane to react with oxygen to produce carbon dioxide and water.

Once exhaust gases have passed through the methane catalyst, the temperature of the exhaust gases will vary depending on the mode in which the engine is running. When the engine is running in the second mode, predominately on methane, excess methane will be oxidised on passing through the methane catalyst. This reaction generates heat thus increasing the exhaust gas temperature to 450-650° C. On the other hand, when the engine is running in the first mode in which diesel is the predominate fuel, there will be no excess methane to be oxidised and therefore the temperature of the exhaust gases will remain substantially at 250-450° C.

It is known that a methane oxidising catalyst typically operates effectively only at or above a minimum "light-off" temperature. This temperature is typically around 425 to 475° C.

According to the present invention there is provided an exhaust system for a dual fuel engine comprising a catalyst assembly comprising a first catalyst comprising a methane oxidising catalyst and a second catalyst comprising a selective catalytic reduction catalyst, the first catalyst being positioned upstream of the second catalyst.

By means of the exhaust system of the present invention, all exhaust gases whether produced when the dual fuel engine is running in a first mode predominately fuelled by a liquid fuel, or in a second mode predominately fuelled by a gaseous fuel will pass initially through the first catalyst and then through the second catalyst.

Preferably, the exhaust system comprises an input and an output.

When the engine is running in the first mode in which it runs on a liquid fuel such as diesel, very little if any methane will be contained within the exhaust gases and therefore the exhaust gases will simply pass through the first catalyst. The exhaust gases will then pass through the second catalyst before exiting the exhaust system via the exhaust output.

When the engine is running in the second mode, fuelled predominately on methane, the first catalyst will enable methane to be oxidised to produce carbon dioxide and water.

Preferably, the catalyst assembly further comprises an injector for injecting urea into the exhaust system, the injector being positioned between the first and second catalysts.

In other words, the injector is positioned downstream of the first catalyst and upstream of the second catalyst. As exhaust gases flow through the exhaust system they will initially pass through the first catalyst before passing the injector at which point urea may be sprayed onto the exhaust gases. The exhaust gases then pass through the second catalyst enabling the levels of $NO_x$ to be reduced in a known manner.

The second catalyst and the urea injected by the injector together form an SCR system.

Preferably, the exhaust system further comprises a heat sink positioned downstream of the first catalyst and upstream of the second catalyst. The heat sink may be used for example when the engine is running in the second mode in which it is fuelled predominately by a gaseous fuel. In such a mode, exhaust gases will be of a higher temperature and could therefore impede the NOx reduction ability of the SCR catalyst.

The heat sink may be in the form of any suitable device adapted to reduce the temperature of exhaust gases. For example, the heat sink may comprise a heat transfer device or other type of cooler.

The heat sink may be considered to be a heat rejection device, and preferably is adapted to transfer excess heat from the exhaust gases away from the second catalyst, and preferably out of the exhaust system.

It is to be understood however that the exhaust system according to the present invention may not require a heat sink, as the necessity for a heat sink is dependent, inter alia, on the composition of the second catalyst. A heat sink may not be necessary if the second catalyst is able to accommodate the exhaust gas temperatures in both of the engine modes for example.

Advantageously, the second catalyst surrounds the first catalyst.

This means that less space is taken up by the catalyst assembly as a whole than would be the case if the first and second catalysts were formed separately to one another. This can be advantageous in ensuring efficient design of the exhaust system.

The first and second catalysts may be joined together by any convenient means, but preferably the first and second catalysts are welded to one another.

The catalyst assembly may have any convenient shape, but preferably the catalyst assembly is substantially cylindrical.

In such a catalyst assembly, the first and second catalysts are preferably substantially coaxial to one another.

Preferably, each of the first and second catalysts is substantially cylindrical, the second catalyst having a cross-sectional diameter that is larger than the cross-sectional diameter of the first catalyst.

The second catalyst is thus ring, or doughnut, shaped and comprises a hollow portion defined within the second catalyst, which is substantially cylindrical and has a diameter that is substantially the same as or slightly larger than the diameter of the first catalyst. The first catalyst may thus fit into the hollow portion of the second catalyst. The overall volume taken up by the catalyst assembly is thus defined by the dimensions of the second catalyst.

Advantageously, the catalyst assembly comprises an inlet and an outlet.

Preferably, the inlet forms part of, and extends from, the first catalyst. Conveniently the outlet forms part of, and extends, from the second catalyst.

The catalyst assembly input ensures that the exhaust gases entering the catalyst system will flow initially through the first catalyst, and the catalyst assembly output causes exhaust gases to exit the catalyst system after flowing through the second catalyst.

Preferably, the exhaust system comprises a first guide for guiding exhaust gases from the engine through the first catalyst. Advantageously, the first guide is adapted to guide exhaust gases into the input of the catalyst assembly.

The first guide may take any convenient form and may for example be a conduit extending from the exhaust inlet to the first catalyst, or to the inlet of the catalyst assembly.

Advantageously, the first guide comprises an enclosed volume having a perforated baffle plate. The enclosed volume may be defined by a conduit, for example. Such a first guide helps to ensure that there is a substantially even distribution of exhaust gases across a face of the first catalyst.

Alternatively, or in addition, the first guide comprises the diffuser cone extending from the exhaust inlet or the inlet of the catalyst assembly towards the first catalyst.

Preferably, the diffuser cone comprises a plurality of conical sections. Advantageously the conical sections are substantially concentric with one another.

Preferably, each of the conical sections has a taper profile, the angle of each taper profile being determined by the desired flow distribution required.

Advantageously the exhaust system comprises a second guide for guiding exhaust gases through the second catalyst after the gases have passed through the first catalyst.

The second guide may take any convenient form and may for example be in the form of a buffer.

Alternatively, or in addition, in embodiments of the invention where each of the first and second catalysts is substantially cylindrical, the second catalyst having a cross-sectional diameter that is larger than the cross-sectional diameter of the first catalyst, the second guide may comprise a wall, or other barrier, extending from the catalyst assembly, downstream of the first catalyst. Such a wall or barrier may for example be an extension of a casing surrounding the first catalyst. Such a wall or barrier helps to prevent recirculation of exhaust gases emerging from the first catalyst and thus helps prevent such exhaust gases re-entering the first catalyst.

The catalyst assembly may comprise more than one second guide.

According to a second aspect of the present invention there is provided a dual fuel engine comprising an exhaust system according to the first aspect of the present invention.

The exhaust system forming part of the dual fuel engine according to the second aspect of the present invention may have one or more of the preferred or advantageous features described hereinabove with reference to the exhaust system according to the first aspect of the present invention.

According to a third aspect of the present invention there is provided a catalyst assembly for a dual fuel engine, the catalyst assembly comprising a first catalyst comprising a methane oxidising catalyst and a second catalyst comprising a selective catalytic reduction catalyst, the first catalyst being positioned upstream of the second catalyst.

The catalyst assembly according to the third aspect of the present invention may have one or more of the preferred or advantageous features described hereinabove with reference to the exhaust system according to the first aspect of the present invention.

According to a fourth aspect of the present invention there is provided a method for removing nitrogen oxide and methane from exhaust gases of a dual fuel engine comprising the steps of:

passing exhaust gases through a first catalyst forming part of a catalyst assembly, the first catalyst comprising a methane oxidising catalyst; causing the exhaust gases to come into contact with a reactant; and guiding the exhaust gases through a second catalyst comprising a selective reduction catalyst.

The invention will now be further described by way of example only with reference to the accompanying drawings in which:

FIGS. 6 to 11 are schematic representations of embodiments of injectors forming part of the catalyst assembly of FIG. 1;

Figure 1:
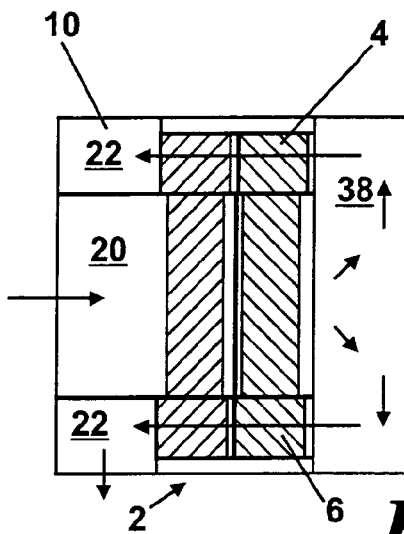
FIG. 1 is a schematic representation of a catalyst assembly forming part of an exhaust system according to an embodiment of the present invention.
Figure 2:
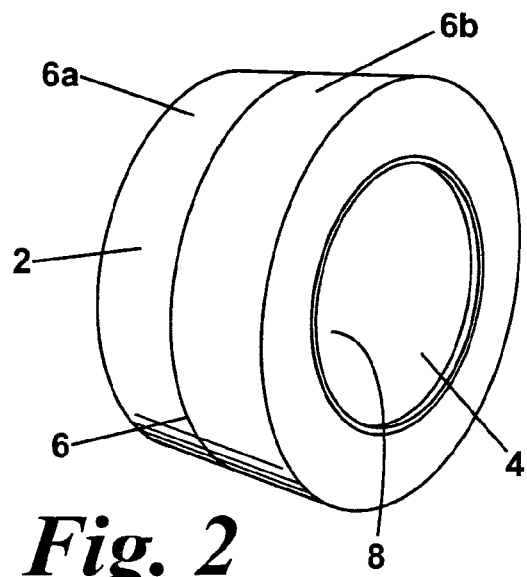
FIG. 2 is a perspective schematic representation of the catalyst system of FIG. 1.
Figure 3:
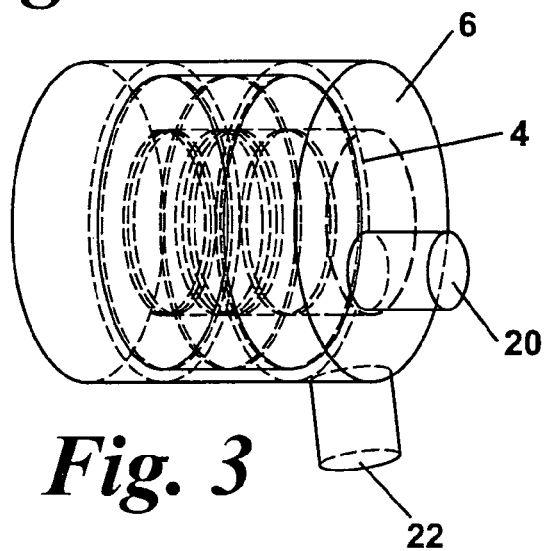
FIG. 3 is a schematic representation of the catalyst system of FIGS. 1 and 2 showing the inlet and the outlet to the catalyst system.

Referring to the FIGS. 1 to 11, a catalyst assembly forming part of an exhaust system 10 according to an embodiment of the first aspect of the present invention is designated generally by the reference numeral 2.

The catalyst assembly 2 is positioned within the exhaust system 10 of a dual fuel combustion engine 100. The dual fuel engine is adapted to run in one of two modes. In a first mode the engine is adapted to run on a first fuel which, in this example, is diesel, and in a second mode the engine is adapted to run predominately on a second fuel, which in this example is natural gas (methane).

The exhaust system comprises an input 30 and output 32. In this embodiment the exhaust system output comprises a tail pipe 34.

The catalyst system 2 comprises a first catalyst 4 comprising a methane oxidising catalyst, and a second catalyst comprising selective catalytic reduction (SCR) catalyst 6.

In the illustrated embodiment, the second catalyst 6 surrounds the first catalyst 4. This reduces the amount of space necessary within the exhaust system to accommodate the two catalysts. In an alternative embodiment (not shown), the catalysts 4, 6 may be spaced apart from one another with the oxidising catalyst 4 being positioned upstream of the SCR catalyst 6 within the exhaust system 10.

The catalyst assembly 2 is substantially cylindrical in shape, and the catalysts 4, 6 are each substantially cylindrical in shape and are coaxial with one another. The second catalyst 6 comprises a hollow substantially cylindrical central portion 8 having substantially the same or slightly larger dimensions than those of the catalyst 4. The second catalyst 6 is thus adapted to receive the first catalyst 4 within the hollow central portion 8. The catalysts 4, 6 may be joined together by any convenient means and in the illustrated embodiment the catalysts 4, 6 are welded together. In addition, in this embodiment each catalyst 4, 6 is formed from two portions 4a, 4b and 6a, 6b respectively. The portions 4a, 4b and 6a, 6b are welded together.

The exhaust system 10 further comprises a first guide 12 for guiding exhaust gases entering the exhaust system 10 such that the gases pass initially through the first catalyst 4, but not the second catalyst 6. In this embodiment the first guide 12 comprises a conduit 12a defining an enclosed volume, and a perforated baffle 12b extending across a face 40 of the first catalyst. Such an arrangement helps to ensure even distribution of exhaust gases across the face 40 of first catalyst 4.

The first catalyst 4 is positioned upstream of the second catalyst 6. The exhaust system 10 further comprises second guides 14, 15 positioned downstream of the first catalyst 4 and upstream of the second catalyst for guiding exhaust gases that have passed into the first catalyst 4 through the second catalyst 6.

The second guides may be in the form of curved guides or baffles 14 which help to direct the flow of exhaust gases onto a face 60 of the second catalyst 6. The catalyst system comprises a further second guide 15 in the form of a wall or barrier extending beyond face 60 (in the downstream direction) of the second catalyst 6. The wall may for example, be an extension of an outer casing surrounding the first catalyst 4. The wall helps to prevent recirculation currents of exhaust gases in this region and therefore helps to prevent exhaust gases re-entering the first catalyst 4 once the gases have emerged from the first catalyst 4.

The catalyst system further comprises an input 20 attached to and extending from the first catalyst 4 and an output 22 attached to, and extending from the second catalyst. The first guide 12 is adapted to guide exhaust gases entering the exhaust system 10 into the input 20 such that gases pass initially through the first catalyst 4.

When gases have then been guided by the second guides 14, 15 through the second catalyst 6, the gases emerge via the output 22 and leave the exhaust system via a tail pipe 34. The tail pipe 34 may be located in any convenient position downstream of the second catalyst 6.

Figure 4:
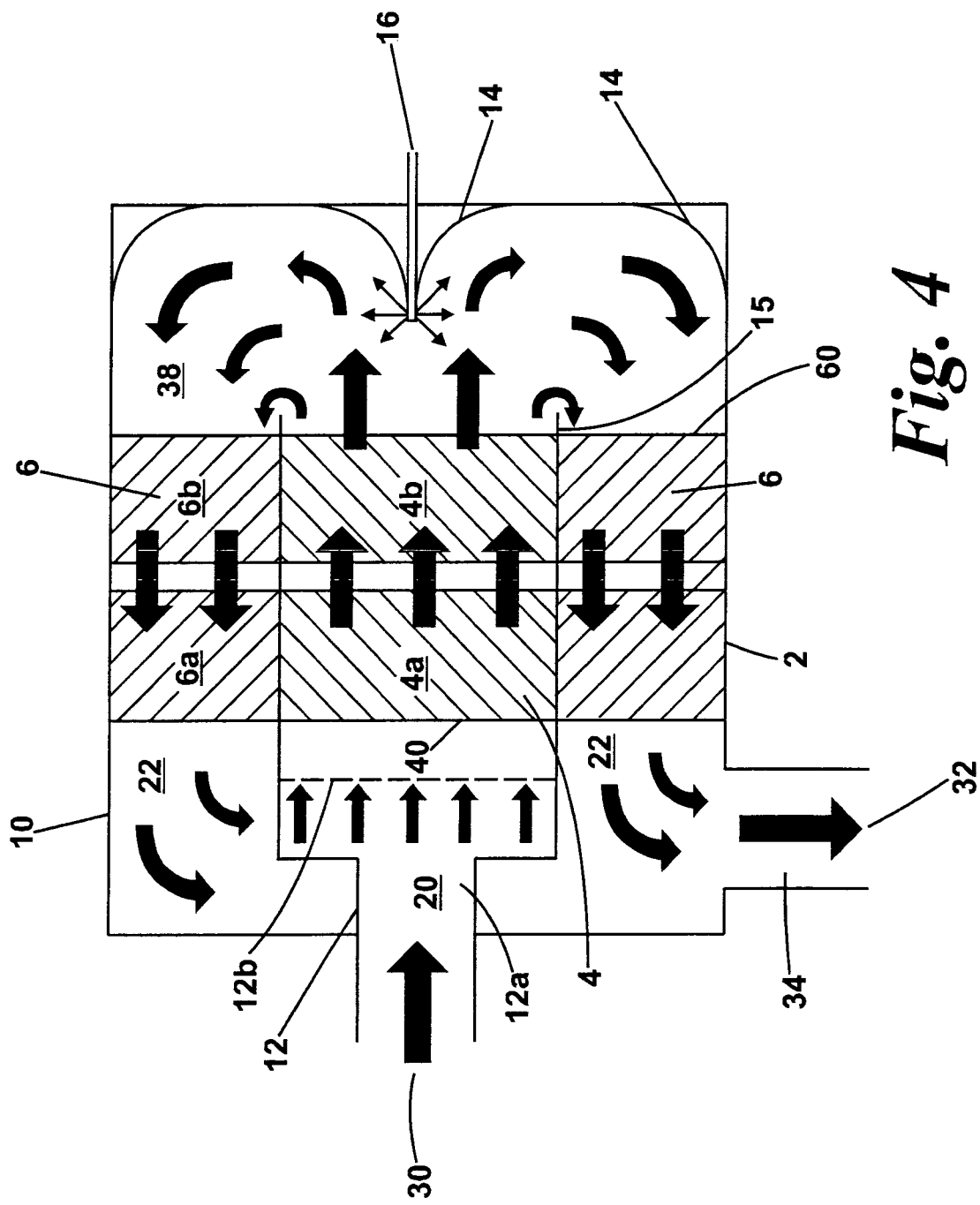
FIG. 4 is a detailed schematic representation of the catalyst system of FIGS. 1 to 3 showing flow of exhaust gases through the catalyst system.
Figure 5:
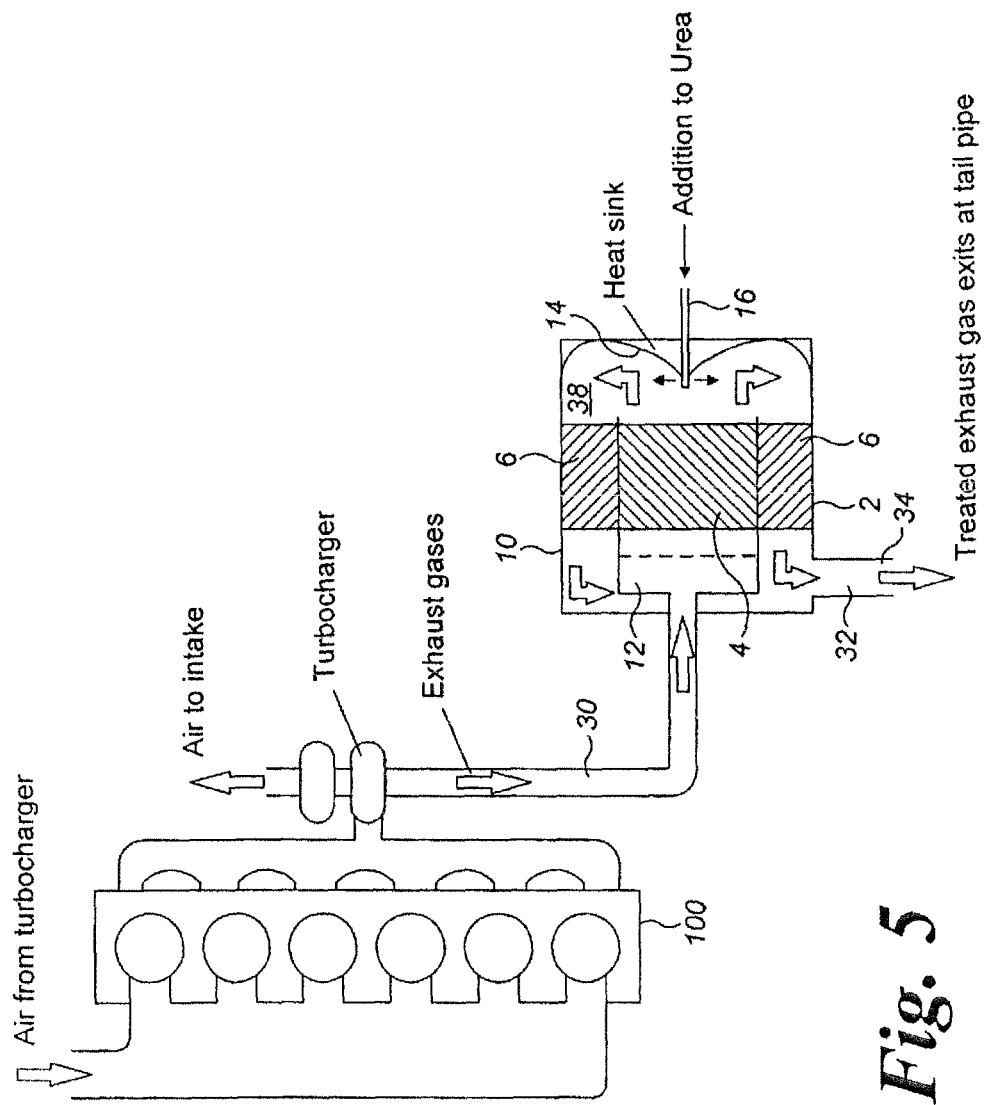
FIG. 5 is a schematic representation of an exhaust system for a dual fuel engine comprising the catalyst assembly of FIGS. 1 to 4.
Figure 12:
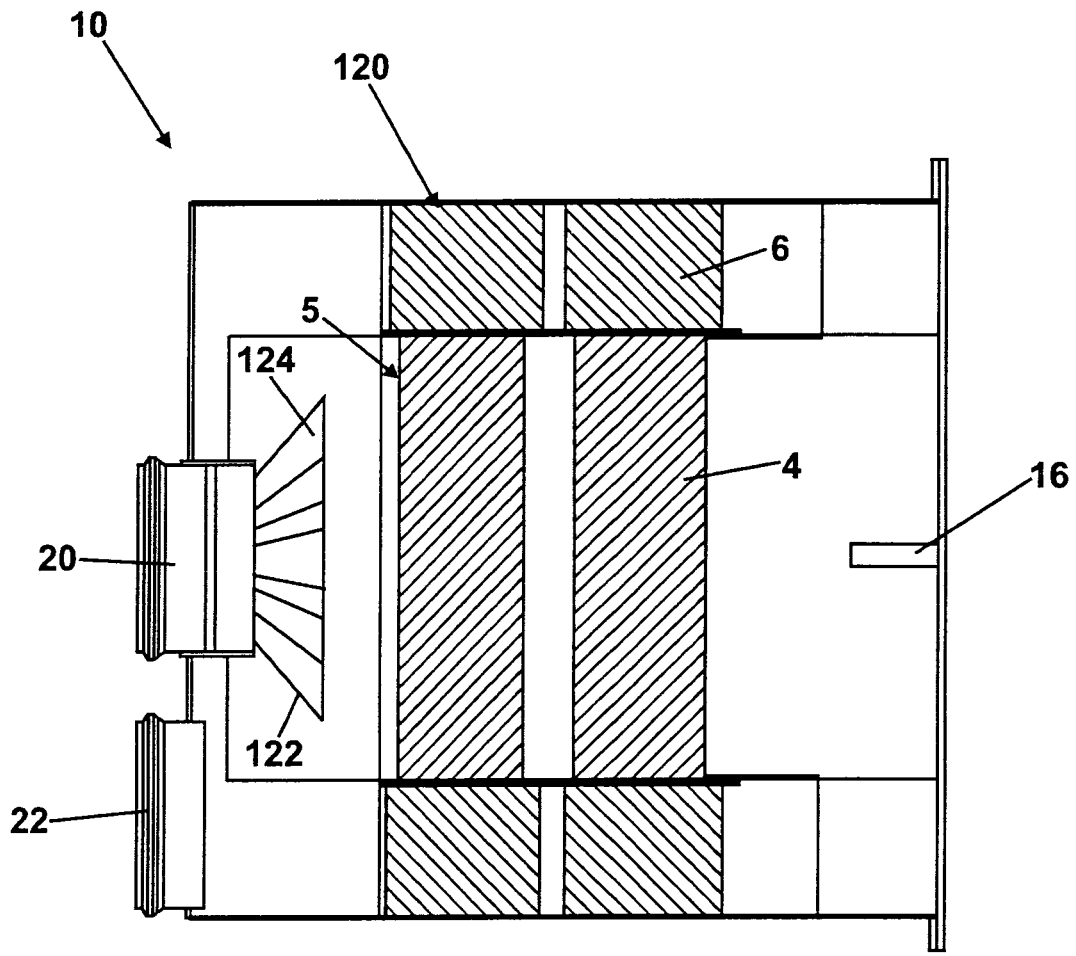
FIG. 12 is a schematic representation of a catalyst assembly according to a second embodiment of the present invention.
Figure 13:
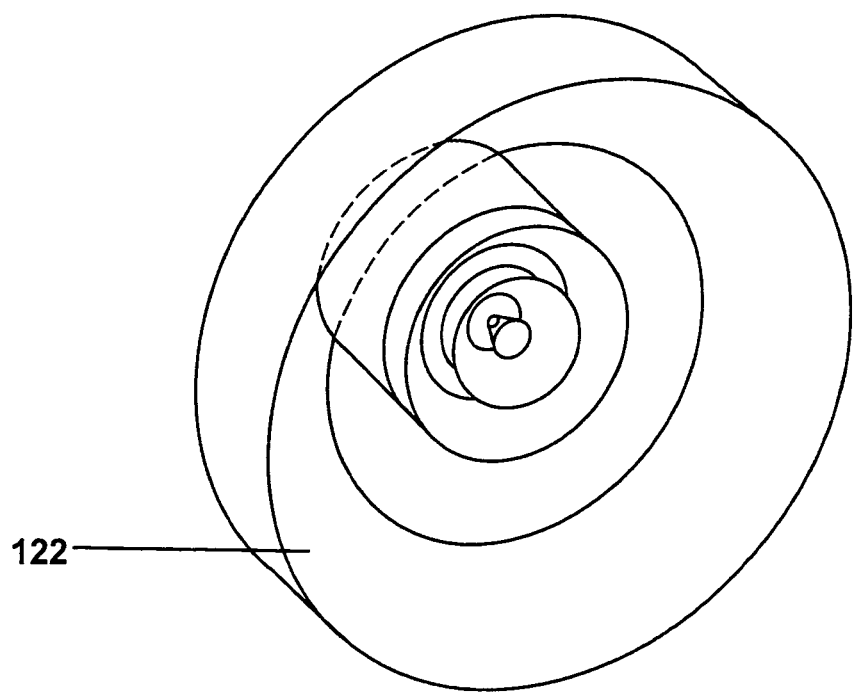
FIG. 13 is a schematic representation of a diffuser cone forming part of the catalyst assembly of FIG. 12.

The pressure drop across each catalyst 4, 6 prevents back flow through the catalyst assembly 2 and helps to ensure that gases follow the guided path through the exhaust system illustrated by the arrows in FIG. 4.

The pressure of gas entering the catalyst system at inlet 20 can typically be in the region of 10 kPa to 25 kPa, and the pressure of the exhaust gases exiting the catalyst system via output 22 may be approximately atmospheric.

The exhaust system further comprises an injector 16 positioned downstream of the first catalyst 4 and upstream of the second catalyst 6. The catalyst 6 and the injector 16 together form an SCR system 200.

The injector 16 may take any suitable form, and the catalyst assembly may comprise more than one injector.

The injector is adapted to spray urea substantially within the volume indicated by reference numeral 38 which volume is positioned downstream of the first catalyst and upstream of the second catalyst.

FIGS. 6 to 11 show different arrangements of injector which are suitable for injecting urea into the catalyst assembly of FIG. 1. In FIGS. 6 and 7, the injector 16 comprises a spray adapted to spray urea into exhaust gases flowing from the first catalyst 4 into the second catalyst 6 such that the urea flow mixes with the flow of the exhaust gases.

In FIG. 8 the injector 16 comprises an annular ring which is adapted to spray urea in substantially the same direction of flow as the direction of flow of the exhaust gases to ensure optimum mixing.

In FIG. 9, the injector 16 comprises a tube 17 extending through the first catalyst 4 which tube is adapted to spray urea out of the tube. The injector 16 injects urea into the tube 17. A small percentage of exhaust gases entering the inlet 20 is bled through the tube 17 in order that the urea is carried by this small percentage of exhaust gases into volume 38.

In FIG. 10, the injector 16 comprises an annular spray ring similar to that shown in FIG. 8 which is adapted to spray urea in such a way that it mixes with the flow of the exhaust gases.

In FIG. 11, the injector extends through the first catalyst 4.

Gases entering the exhaust system 10 will initially pass through the first catalyst 4. When the dual fuel engine is running in the second mode in which it is fuelled predominately by methane, exhaust gases will have a temperature in the region of 600° C. which is above the light-off temperature of the methane oxidising catalyst. This means that any uncombusted methane is able to react with oxygen in the exhaust system in order to produce carbon dioxide and water.

When the engine is running in the first mode in which it is fuelled predominately or entirely by diesel, gases will merely pass through the first catalyst 4 but no reaction will take place.

On exiting the first catalyst 4, exhaust gases will enter volume 38 and will pass by the injector 16 where the gases will be sprayed with urea. The gases will then be guided by the second guides 14, 15 into the second catalyst 6. The second catalyst 6 enables the exhaust gases to react with the urea in order to convert $NO_x$ to nitrogen and water.

When the engine is running in the second mode, NO will still be present in the exhaust gases and therefore the gases will undergo the reaction described hereinabove with reference to the first mode also when the engine is running in the second mode.

In order to ensure that gases passing through the second catalyst 6, are at an appropriate temperature, the engine system may further comprise a heat sink 18 adapted to reduce the temperature of gases emerging from the first catalyst 4 before entering the second catalyst. This ensures that the gases flowing through the second catalyst 6 pass through at an appropriate temperature. The heat sink is preferably positioned downstream of the first catalyst 4, and upstream of the second catalyst 6.

Referring now to FIGS. 12 to 15 a catalyst assembly according to a second embodiment of the present invention is designated generally by the reference numeral 120. Parts of the catalyst system 120 that correspond to parts of the catalyst system 2 have been given corresponding reference numerals for ease of reference.

The catalyst assembly 120 is suitable for forming part of exhaust system 10 described hereinabove.

In this embodiment of the invention, the inlet 20 of the catalyst system 120 comprises a diffuser cone 122. The diffuser cone 122 guides exhaust gases entering the exhaust system 10 such that these gases spread out to increase the flow face area onto the first catalyst 4.

Figure 14:
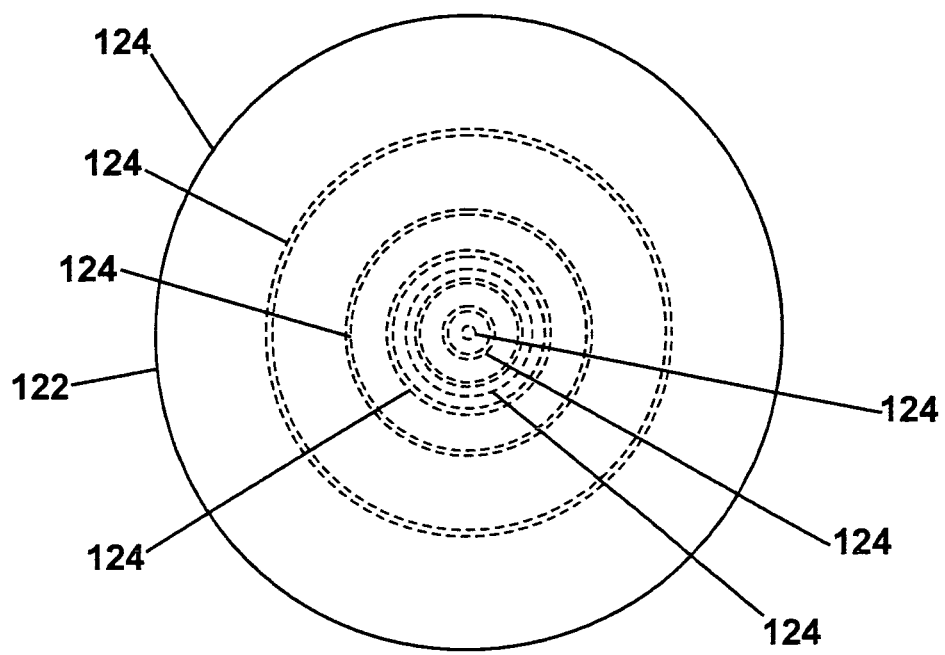
FIG. 14 is a cross-sectional representation of the diffuser cone of FIG. 13.

The diffuser cone 122 comprises a plurality of conical sections 124 as shown particularly in FIG. 14. The conical sections 124 are positioned so that they are substantially concentric to one another and are attached to the inlet 20 of the catalyst system 120, as shown particularly in FIG. 12. Each of the conical sections 124 may have a taper profile, and is angled in order to give a desired flow distribution across the first catalyst 4.

The angles of the conical sections may be calculated using a ratio of the cross section of the inlet 20 to the cross section of the face 5 of the catalyst 4, together with the distance between the inlet pipe 20 and the face 5.

The cone sections may be curved rather than tapered, depending on space available.

As the exhaust gases flow through the inlet 20 and into the diffuser cone 122, the flow of exhaust gases is split, or partitioned, by the conical sections 124 and is guided to appropriate areas of face 5 of the first catalyst 4 in order that substantially the entire catalytic area of the first catalyst 4 is utilised.

The dimensions, shapes and angles of the conical sections 124 may thus be designed to reduce the desired flow distribution.

In this embodiment, therefore, the first guide 12 comprises the diffuser cone 122. The diffuser cone 122 thus replaces the perforated baffle 12b illustrated in FIG. 4, although in other embodiments, the first guide 12 could comprise a diffuser cone 122 and a perforated baffle 12b.

Figure 15:
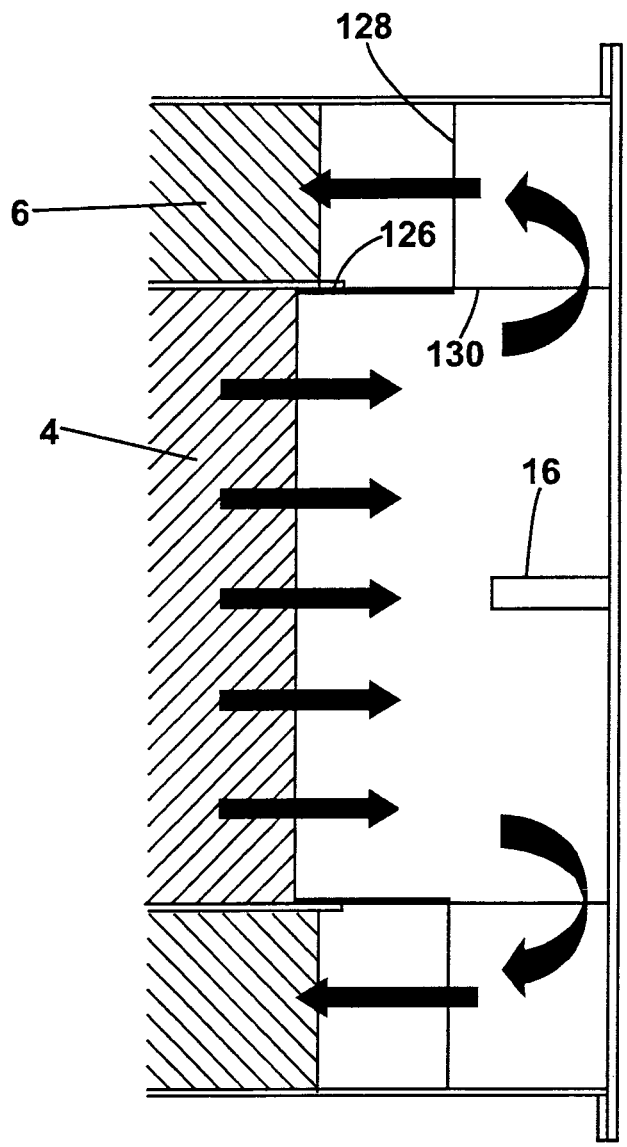
FIG. 15 is a detailed schematic representation of a portion of the catalyst assembly of FIG. 12 downstream of the first catalyst, and upstream of the second catalyst.

Turning now to FIG. 15 a portion of the exhaust system 10 positioned downstream of first catalyst 4, and upstream of the second catalyst 6 is illustrated in more detail.

In this embodiment the second guides are in the form of an extended plate 126. The extended plate 126 comprises a tube extending from the first catalyst 4. The extended plate 126 guides exhaust gases towards the injector 16.

The second guide further comprises an annular baffle 128, and the extended plate 126 extends from the first catalyst 4 to the annular baffle 128. The annular baffle is perforated and helps to ensure that a uniform flow of gases enters the face area of the second catalyst 6.

The second guide further comprises a perforated tube section 130 extended from the extended plate 126 to the end of the exhaust system 10.

The perforated tube section 130 creates a partially contained region created by a slight pressure drop through the perforation. This pressure drop reduces the flow velocity and effectively provides a longer residence time of the urea within volume 38, which helps to redistribute the urea spray, and progress the thermolysis reactions to produce ammonia. This provides an improved mixing and atomisation process as urea is injected by injector 16.

The invention claimed is:

1. An exhaust system for a dual fuel engine comprising a catalyst assembly comprising:
   a housing containing:
   a first catalyst comprising a methane oxidizing catalyst;
   a second catalyst comprising a selective catalytic reduction catalyst, the first catalyst being positioned upstream of the second catalyst;
   a first guide positioned within the housing for guiding all exhaust gases from the engine and through the first catalyst; and
   a second guide positioned within the housing for guiding all exhaust gases through the second catalyst after the exhaust gases have passed through the first catalyst, wherein the first guide comprises an enclosed volume having a perforated baffle plate and wherein the perforated baffle plate guides all said exhaust gases into the first catalyst;
   wherein the second catalyst surrounds the first catalyst.

2. An exhaust system according to claim 1, further comprising an injector for injecting urea into the exhaust system, the injector being positioned between the first and second catalysts.

3. An exhaust system according to claim 1, further comprising a heat sink positioned-downstream of the first catalyst and upstream of the second catalyst.

4. An exhaust system according to claim 1, wherein the catalyst assembly is substantially cylindrical and the first and second catalysts are substantially coaxial.

5. An exhaust system according to claim 1, wherein the catalyst assembly comprises an input and an output.

6. An exhaust system according to claim 5, wherein the input forms part of, and extends from, the first catalyst.

7. An exhaust system according to claim 5, wherein the output forms part of, and extends from, the second catalyst.

8. A dual fuel engine comprising an exhaust system according to claim 1.

9. A catalyst assembly for a dual fuel engine, the catalyst assembly comprising:
　a housing containing;
　a first catalyst comprising a methane oxidizing catalyst;
　a second catalyst comprising a selective catalytic reduction catalyst, the first catalyst being positioned upstream of the second catalyst;
　a first guide positioned within the housing for guiding all exhaust gases from the engine and through the first catalyst; and
　a second guide positioned within the housing for guiding all exhaust gases through the second catalyst after the exhaust gases have passed through the first catalyst, wherein the first guide comprises an enclosed volume having a perforated baffle plate and wherein the perforated baffle plate guides all said exhaust gases into the first catalyst;
　wherein the second catalyst surrounds the first catalyst.

10. A catalyst assembly according to claim 9, wherein the catalyst assembly is substantially cylindrical and the first and second catalyst components are substantially coaxial.

11. A method for removing nitrogen oxide and methane from exhaust gases of a dual fuel engine comprising the steps of:
　guiding all exhaust gases from the engine and into a first catalyst forming part of a catalyst assembly, using a first guide positioned within a housing and comprising an enclosed volume having a perforated baffle plate;
　passing all exhaust gases through the first catalyst, the first catalyst comprising a methane oxidizing catalyst;
　causing the exhaust gases to come into contact with a reactant;
　guiding all exhaust gases from the first catalyst and into a second catalyst, using a second guide positioned within the housing; and
　passing all exhaust gases from the first catalyst through the second catalyst, the second catalyst comprising a selective reduction catalyst, the second catalyst surrounding the first catalyst.

* * * * *